United States Patent Office 3,485,864
Patented Dec. 23, 1969

3,485,864
DIPHENYLBORINIC ACID ESTERS
Herman A. Birnbaum, Mendota Heights, and Stephen T. Quigley, St. Paul, Minn., assignors to Minnesota Mining and Manufacturing Company, St. Paul, Minn., a corporation of Delaware
No Drawing. Filed Jan. 12, 1965, Ser. No. 425,081
Int. Cl. C07f 5/04; A01n 9/00
U.S. Cl. 260—462                                  3 Claims

ABSTRACT OF THE DISCLOSURE

Defoliation of plants such as cotton, beans, etc. utilizing as an active defoliation agent a diphenylborinic acid ester of the formula:

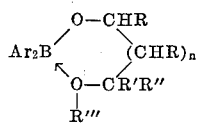

wherein Ar is phenyl or substituted phenyl, each R is hydrogen or lower alkyl, R' is hydrogen or lower alkyl, R'' is hydrogen, R''' is selected from the class of alkyl groups containing up to 18 carbon atoms, aryl and alkyl-substituted aryl groups containing 6–10 carbon atoms and alkoxy-alkyl groups containing up to 18 carbon atoms, $n$ is 0 or 1 and wherein R' and R''' or R', R'' and R''' can form a five or six-membered heterocyclic ring through the atoms to which they are bonded.

---

This invention relates to methods for defoliation of various plants, to defoliant compositions and to certain compounds which are active defoliating agents.

Processes for defoliating certain plants including, among others, cotton and soybeans, are of great utility in agriculture, particularly with the increased use of mechanical pickers and harvesters. The defoliation of certain crops is in fact an economic necessity when they are mechanically harvested since defoliated plants are free from leaves which would otherwise tend to clog mechanical harvesting equipment and add to the trash in the portion of the plant being harvested. Also, mechanical harvesting equipment can be more exactly positioned with respect to the plants to be harvested in fields in which the plants have been defoliated since the plants are not obscured by leaves. Although the defoliation of various plants which are to be harvested by hand is somewhat less essential than if they are to be mechanically harvested, fields which are to be harvested by hand are also commonly defoliated. The removal of the leaves prior to hand picking cotton, for example, renders it easier and more comfortable to pick and the picking can be accomplished more quickly.

Furthermore, defoliation offers advantages in certain crops which are not directly connected with the harvesting process. Thus, for example, in the defoliation of cotton, the resultant increased exposure to sun and the drying action of the air movement through the defoliated field causes the mature cotton bolls to open more quickly. Boll rot and seed and fiber deterioration in the field and subsequent staining of the cotton caused by crushed leaves are all reduced.

A number of compositions have been used heretofore in the defoliation of cotton, soybeans and other plants. The mechanism of action of most such defoliants has involved the caustic and/or desiccating action of the chemical which dries up the leaf without causing it to drop free of the petiole. Such defoliants do not operate quickly and cleanly, since the passage of a substantial amount of time is required before all of the leaves are finally broken from the plants. In addition the plants themselves are embrittled and are therefore more difficult to harvest.

The defoliants of the present invention appear to operate in a completely different way. Although the mechanism is not completely understood, it appears that their action is due primarily to a hormone-type activity which actually induces the plant to form a corky layer at the abscission point of the petiole structure which in turn causes the leaf to drop from the petiole. This relatively rapid and localized action often appears not to otherwise affect the plant, the leaves which fall to the ground being substantially undamaged while the remainder of the plant continues to live. The defoliation occurs relatively rapidly, e.g. sometimes within 24 hours after application of the defoliant. Furthermore, re-growth of foliage after defoliation appears to be suppressed in many instances.

It is therefore an object of the present invention to provide a new and valuable class of plant defoliants. It is a further object of the invention to provide a new and improved process for the removal of foliage from plants. It is a further object of the invention to provide a novel class of compositions defoliant which act quickly and effectively but with no substantial secondary damage to the plant. It is a further object of the invention to provide a novel class of chemical compounds which are highly active defoliating agents. Other objects will become evident from the disclosure which follows.

The active defoliating agents of the invention have the formula

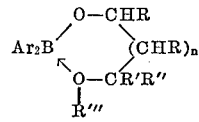

where Ar is phenyl or substituted phenyl, each R is hydrogen or lower alkyl, R' is hydrogen or lower alkyl, R'' is hydrogen, R''' is selected from the class of alkyl groups containing up to 18 carbon atoms, aryl and alkyl-substituted aryl groups containing 6–10 carbon atoms and alkoxy-alkyl groups containing up to 18 carbon atoms, $n$ is 0 or 1 and wherein R' and R''' or R', R'' and R''' can form a five or six-membered heterocyclic ring through the atoms to which they are bonded. The substituents on the phenyl ring in Ar are preferably alkyl, aryl, alkoxy or halo. The term "lower alkyl" as used above indicates alkyl groups containing up to about four carbon atoms.

The compounds of the invention can be prepared from known materials by transesterification of an alkyl ester of diphenylborinic acid or of the appropriately substituted diphenylborinic acid and the appropriate alcohol and by esterification of the diphenylborinic anhydride by reacting it with the alcohol. These reactions are as follows:

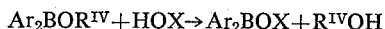

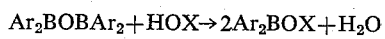

wherein Ar is as previously defined, $R^{IV}$ is preferably lower alkyl (e.g. n-butyl) and XOH is

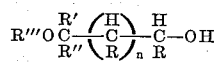

in which the various groups are also as previously defined.

The substituents on the phenyls in the Ar groups can be exemplified in terms of the parent acids. Thus, the compounds of the invention include esters of diphenyl-borinic acid as well as of alkyl-substituted diphenylborinic acids such as di(4-methylphenyl) borinic acid, di(2,4-dimethylphenyl) borinic acid, di(4-ethylphenyl) borinic acid, di(4-butylphenyl) borinic acid, di(2,4-diethylphenyl) borinic acid and di(2,4,6-trimethylphenyl) borinic acid; alkoxy-substituted diphenylborinic acids such as di(4-methoxyphenyl) borinic acid, di(3-methoxyphenyl) borinic acid, di(2-methoxyphenyl) borinic acid, di(4-ethoxyphenyl) borinic acid and di(4-butoxyphenyl) borinic acid; aryl-substituted diphenylborinic acids such as di(4-bisphenyl) borinic acid and di(2-bisphenyl) borinic acid; halo-substituted diphenylborinic acids such as di(3-chlorophenyl) borinic acid, di(4-bromophenyl) borinic acid, di(3-trifluoromethylphenyl) borinic acid and di(2-bromo-4-trifluoromethylphenyl) borinic acid; etc. The terms "a diphenylborinic acid" and "diphenylborinic acids" herein are intended to include those which carry substituents on the phenyls. Although the essential characteristics of active defoliation is common to all of the compounds of the invention, the preferred compounds are the esters of diphenylborinic acid itself since these compounds are highly effective and are prepared from relatively available precursors.

Alcohols of the type XOH are generally known and are widely available.

Cotton, beans and other plants may be defoliated by the application thereto in low concentration of a defoliant composition comprising a compound of the invention as the active agent, and a surface active agent. Ordinarily these constituents are blended with an extending agent or agents together, if desired, with other adjuvants such as buffers, stickers, thickening agents, etc. to form concentrates which are diluted with water to the desired strength just before use. Particularly suitable concentrates includes solutions of the esters and surface active agents in organic solvents such as acetone, butyl carbitol acetate, methyl isobutyl ketone (sometimes referred to herein as MIBK), methanol, tetrachloroethane, methylchloroform, methylene chloride, chloroform, mineral oil, kerosene including superfine grades of kerosene which do not have the kerosene odor, naphthalenes, aromatic solvents, heavy aromatic naphtha and mixtures thereof, etc., and wettable powders comprising blends of pigments (e.g. hydrated silica, salts, diatomaceous earth, etc.) together with the esters and surface active agents. In addition, in certain cases it may also be desirable to add other materials known to have defoliant and/or desiccant activity, e.g. pentachlorophenol, aminotriazole, etc.

As previously noted, the defoliant concentrates also contain a surface active agent. This constituent causes the liquid defoliant composition applied to the plant to spread on the leaves rather than gathering into drops, thus providing a much larger area of contact and, in addition, tending to insure that the defoliant will remain on the plant rather than running off of or being shaken from the plant. Further, in the organic solvent solution type of defoliant concentrate, the surface active agent provides for improved miscibility between the solvent and the ester while in the wettable powder type of concentrate it provides the wettability which enables the concentrate to be easily diluted for use. Both ionic and non-ionic surface active agents are operable in the present invention, e.g. including the condensates of ethylene oxide with a hydrophobic base formed by condensing propylene oxide with propylene glycol (the condensates having molecular weights of 2,000 and 2,900); isooctyl phenyl polyethoxyethanol; an alkyl aryl polyether alcohol; blends of alkyl aryl polyether alcohols with organic sulfonates; the sodium salt of an alkyl aryl polyether sulfonate; the sodium sulfate derivative of 7-ethyl-2-methylundecanol-4; an acylamidoisopropyl hemi-ester of the sodium salt of sulfosuccinic acid of the formula:

CH$_3$(CH$_2$)$_x$CO—NHCH$_2$CH(CH$_3$)
                               OCOCH(SO$_3$Na)(CH$_2$COONa)

wherein $x$ is a number of average value about 12; sodium lauryl sulfate; dodecyl amine hydrochloride; etc.

The defoliant compositions are effective in relatively small amounts, i.e. usually about 0.1 to 25 pounds per acre of plants, and preferably 0.5 to 5 pounds of the ester per acre of plants, being sufficient to cause defoliation. The exact level of effectiveness of a particular ester with respect to any plant cannot be extrapolated with assurance to others although it is clear that they are generally effective as defoliants. The amount of any one ester actually needed will depend upon such factors as the kind of plants to be defoliated, the maturity of the plants, general atmospheric conditions, condition of the soil, and other factors which affect resistivity to defoliation. The surface active agent content of the defoliant composition usually amounts to not less than about 0.05 pound per acre nor more than 20 pounds per acre and preferably from 0.1 to 5 pounds per acre. Smaller amounts of surface active agents are not ordinarily effective and there is no advantage to using larger amounts, although it is possible to use any amount of surface active agent up to a quantity which would be detrimental to the plant being treated.

Preferably, the defoliant compositions will contain from about 10 to 90 parts by weight of the surface active agent and from about 90 to 10 parts by weight of the ester, with solvents, extending agents and other adjuvants added thereto. The total volume of the liquid mixture used is not of critical importance provided the proper amount of ester is applied to the plants. The manner in which the solution is sprayed upon the plants generally determines the amount used. Ordinarily, the surface of the plants should be covered, but there should be no run off. The dilute mixtures are readily applied by any of the conventional means as, for example, dusting, spraying, drenching, etc.

The following examples illustrate methods and compositions used in practicing this invention, but are not to be construed as limiting the scope thereof with regard to the specific esters prepared and tested, the surface active agents employed, the plants defoliated or the methods described for application of the compositions to the plants. Likewise, the particular formulations utilized are merely exemplary, since it is within the skill of the art to prepare further formulations consisting of defoliant vehicles incorporating the esters of diphenylborinic acid and surface active agents as herein disclosed. All parts are given on a weight/volume basis (e.g. milligrams/liter) unless otherwise specified.

For the sake of clarity the compounds of Examples 1–9 are identified by name and structure in the following table. In addition, the esters are designated in Examples 10–12 by Roman numerals and these are also given in the table.

| Ex. No. | Name | Structure | Ester designation |
|---|---|---|---|
| 1 | β-Methoxyethyldiphenylborinate. | φ$_2$B(O—CH$_2$—CH$_2$—O—CH$_3$) | I |
| 2 | β-Ethoxyethyldiphenylborinate. | φ$_2$B(O—CH$_2$—CH$_2$—O—C$_2$H$_5$) | II |
| 3 | β-Butoxyethyldiphenylborinate. | φ$_2$B(O—CH$_2$—CH$_2$—O—C$_4$H$_9$) | III |
| 4 | β-Hexoxyethyldiphenylborinate. | φ$_2$B(O—CH$_2$—CH$_2$—O—C$_6$H$_{13}$) | IV |

| Ex. No. | Name | Structure | Ester designation |
|---|---|---|---|
| 5 | β-Phenoxyethyldiphenylborinate | $\phi_2B\begin{array}{c}O-CH_2\\ \\ O-CH_2\\ |\\ \phi\end{array}$ | V |
| 6 | Diphenylborinic acid ester of 3,6-dioxaoctanol | $\phi_2B\begin{array}{c}O-CH_2\\ \\ O-CH_2\\ |\\ C_2H_4OC_2H_5\end{array}$ | VI |
| 7 | Diphenylborinic acid ester of tetrahydrofurfuryl alcohol | $\phi_2B\begin{array}{c}O-CH\\ \\ \\ O\end{array}$ S | VII |
| 8 | Diphenylborinic acid ester of furfuryl alcohol | $\phi_2B\begin{array}{c}O-CH\\ \\ O\end{array}$ | VIII |
| 9 | Diphenylborinic acid ester of 2-hydroxymethyl 1,3-dioxalane | $\phi_2B\begin{array}{c}O-C\\ \\ O\\ \\ O\end{array}$ | IX |

EXAMPLE 1

Preparation of β-methoxyethyldiphenylborinate

Diphenylborinic anhydride suitable for use herein is obtained by hydrolysis of purified β-amino ethyldiphenylborinate and dehydration of the diphenylborinic acid in the absence of heat (see Chremos et al., J. Org. Chem. 26, 1683 (1969)). By very careful purification of the β-amino ethyldiphenlyborinate and rigid adherence to an air-free atmosphere (all solvents being flushed with nitrogen) crystalline anhydride (melting 132–141° C.) is obtained in a yield of 80 percent. Recrystallization from benzene provides an analytically pure colorless product melting at 142–145° C. Elemental analyses, infrared and NMR analyses are consistent with the structure of diphenylborinic anhydride.

Diphenylborinic anhydride (0.15 mole) and β-methoxyethanol (0.93 mole) are dissolved in benzene and charged to a round bottom flask equipped with a reflux condenser and a Barrett trap. The solution is refluxed for 4 hours during which time a small amount of water is removed in the trap. The desired product is then isolated by fractional distillation, a total yield of about 91.5 per cent of theoretical being recovered. The infrared and nuclear magnetic resonance spectra are consistent with the proposed structure and the elemental analysis is as follows:

*Analysis.*—Calculated for $C_{15}H_{17}BO_2$: C, 75.0%; H, 7.15%; B, 4.5%. Found: C, 75.3%; H, 6.9%; B, 4.48%.

EXAMPLE 2

Preparation of β-ethoxydiphenylborinate

Diphenylborinic anhydride (0.1 mole) and β-ethoxyethanol (0.4 mole) are dissolved in benzene and charged to a round bottom flask equipped as in the previous example. The solution is refluxed for 17 hours during which time a small amount of water is removed in the trap. The desired product is then isolated by fractional distillation, about 91% of the theoretical yield being recovered. The infrared and nuclear magnetic resonance spectra of this material are consistent with the proposed structure and the elemental analysis is as follows:

*Analysis.*—Calculated for $C_{16}H_{19}BO_2$: C, 75.6%; H, 7.53%; B, 4.26%. Found: C, 75.7%; H, 7.6%; B, 4.39%.

EXAMPLE 3

Preparation of β-butoxyethyldiphenylborinate

The precursor n-butyldiphenylborinate is prepared as follows:

A suspension of 48.64 g. (2.0 moles) of magnesium in 200 ml. of tetrahydrofuran is placed in a 3 l., three-necked round bottom flask, equipped with a reflux condenser, stirrer, and a dropping funnel. The system is flushed with nitrogen and the suspension is cooled to 15° C. A solution of 314.0 g. (2.0 moles) of bromobenzene in 400 ml. of tetrahydrofuran is placed in the dropping funnel and 25 ml. of the solution is added to the reaction vessel. A crystal of iodine is added and the reaction starts almost immediately. The remainder of the bromobenzene solution is added dropwise at such a rate as to maintain the temperature at 50–60° C. After addition is complete the reaction mixture is heated under reflux for 30 minutes. The reaction mixture is then cooled to 5° C. and a solution of 230.2 g. (1.0 mole) of tri-n-butylborate in 300 ml. of tetrahydrofuran is added at a rate which keeps the temperature below 6° C. The reaction is heated under reflux for 20 minutes, cooled to 8° C., and 400 ml. of n-hexane are added. This solution is then poured over a mixture of 600 g. of ice and 225 ml. of concentrated hydrochloric acid. The hexane layer is separated, washed free of acid and concentrated under vacuum. A dark brown oil remains and this is taken up in n-hexane and filtered to remove the insoluable salts. This solution is assayed by reacting 10.1 g. of it and 2.3 g. (0.03 mole) of N,N-dimethylaminoethanol to give 4.4 g. (83.1%) of N,N-dimethylamino ethyl diphenylborinate, M.P. 161–166° C. Recrystallization from acetone gives a sample melting at 165–167° C.

The hexane solution of 0.2 mole of n-butyldiphenylborinate and 0.4 mole of β-butoxyethanol also dissolved in hexane are combined and heated under reflux for from 2 to 3 hours. The hexane and butanol are then stripped from the reaction mixture at reduced pressure and the residue is fractionally distilled to yield the desired ester.

EXAMPLE 4

Preparation of β-hexoxyethyldiphenylborinate

A hexane solution of 0.2 mole of n-butyldiphenylborinate and 0.4 mole of β-hexoxyethanol in hexane are combined and heated under reflux for 2–3 hours. The reaction mixture is then stripped of the hexane and butanol under reduced pressure and the residue is fractionally distilled to recover the desired product.

EXAMPLE 5

Preparation of β-phenoxyethyldiphenylborinate

Crude β-phenoxyethyldiphenylborinate is prepared by transesterification of crude n-butyldiphenylborinate in tetrahydrofuran with phenyl Cellosolve. This material is immediately vacuum distilled to produce a bright yellow oil which is allowed to stand for several days. At the end of this time a grayish waxy solid has settled out of the oil. The oil is removed by decantation and the solid is dissolved in hexane and treated twice with charcoal to remove most of the waxy material and allowed to re-precipitate. The recovered tan solid is washed thoroughly with diethylether. Fractional recrystallization (3 times) of this material from hexane gives a colorless sample of the desired ester melting point 78–82° C. The infrared and nuclear magnetic resonance spectra are consistent with the proposed structure and the elemental analysis is as follows.

*Analysis.*—Calculated for $C_{20}H_{19}BO_2$: C, 79.5%; H, 6.33%; B, 3.58%. Found: C, 79.6%; H, 6.4%; B, 4.21%.

EXAMPLE 6

Preparation of the diphenylborinic acid ester of 3,6-dioxaoctanol

Diphenylborinic anhydride (0.1 mole) and 3,6-dioxaoctanol (0.4 mole) are dissolved in benzene and charged to a round bottom flask equipped with a reflux condenser and a Barrett trap. The solution is refluxed for 18 hours during which time a small amount of water is removed in the trap. At the end of that time the desired product is isolated by fractional distillation, a total yield of about 86% of the theoretical amount being recovered. The infrared spectrum indicates that the product contains some impurities, but is mainly the desired material. The elemental analysis is as follows.

Analysis.—Calculated for $C_{18}H_{23}BO_3$: C, 72.6%; H, 7.77%; B, 3.64%. Found: C, 72.2%; H, 7.75%; B, 4.80%.

Similarly γ-ethoxypropyldiphenylborinate is prepared from diphenylborinic anhydride and γ-ethoxypropanol.

EXAMPLE 7

Preparation of the diphenylborinic acid ester of tetrahydrofurfurylalcohol

Diphenylborinic anhydride (0.1 mole) and tetrahydrofurfurylalcohol (0.4 mole) are dissolved in benzene and charged to a round bottom flask equipped with a reflux condenser and a Barrett trap. The solution is refluxed for 4 hours during which time a small amount of water is removed in the trap. At the end of that time the desired product is isolated by fractional distillation, a total yield of about 95% of the theoretical amount being recovered. The elemental analysis is as follows.

Analysis.—Calculated for $C_{17}H_{19}BO_2$: C, 76.7%; H, 7.2%; B, 4.06%. Found: C, 77.0%; H, 7.2%; B, 4.52%.

Similarly the diphenylborinic acid ester of 2-hydroxymethyl-1,3-dioxane is prepared from diphenylborinic anhydride and 2-hydroxymethyl-1,3-dioxane.

EXAMPLE 8

Preparation of the diphenylborinic acid ester of furfurylalcohol

Diphenylborinic anhydride (0.1 mole) and furfuryl alcohol (0.4 mole) are dissolved in benzene and charged to a round bottom flask equipped with a reflux condenser and a Barrett trap. The solution is refluxed for 7 hours during which time a small amount of water is removed in the trap. At the end of that time, the desired product is isolated by fractional distillation, a total yield of about 95% of the theoretical amount being recovered. The elemental analysis is as follows.

Analysis.—Calculated for $C_{17}H_{15}BO_2$: C, 77.8%; H, 5.78%; B, 4.13%. Found: C, 76.6%; H, 6.5%; B, 5.17%.

EXAMPLE 9

Preparation of diphenylborinic acid ester of 2-hydroxymethyl 1,3-dioxalane

Diphenylborinic anhydride (.05 mole) and 2-hydroxymethyl 1,3-dioxalane (0.1 mole) are dissolved in 50 ml. of benzene and charged to a round bottom flask equipped with a reflux condenser in a Barrett trap. The solution is refluxed for 4 hours during which time approximately 0.9 ml. of water is removed in the trap. At the end of that time the desired product is isolated by fractional distillation, a yield of about 71% of the theoretical amount being recovered in the main fraction ($n_D^{25}$ 1.5592). The infrared spectrum is consistent with the proposed structure and the elemental analysis is as follows.

Analysis.—Calculated for $C_{17}H_{19}BO_3$: C, 72.3%; H, 6.76%; B, 3.83%. Found: C, 72.1%; H, 6.6%; B, 4.0%.

Esters according to the invention in which Ar is substituted phenyl can be prepared from the respective anhydrides and alcohols in the manner shown in Example 1. The anhydrides are prepared by hydrolysis of an ethanolamine or other lower alkanol amine ester of the substituted diphenylborinic acid and dehydration of the acid as also shown in Example 1.

The following descriptions, including uncorrected melting points where available of a number of the alkanolamine esters will serve to characterize them and are generally illustrative thereof:

| Ester | M.P. or appearance |
|---|---|
| 2-amino-2-methyl propanol ester of di(4-fluorophenyl)borinic acid. | 227–228° C. |
| Ethanol amine ester of di(4-fluorophenyl) borinic acid. | 240–241° C. |
| Ethanol amine ester of di(4-methylphenyl) borinic acid. | White, crystalline. |
| 2-amino-2-methyl propanol ester of di(4-methylphenyl) borinic acid. | 212–213° C. |
| N,N-dimethylethanol amine ester of di(4-fluorophenyl) borinic acid. | White, crystalline. |
| N,N-dimethylethanol amine ester of di(4-chlorophenyl) borinic acid. | Do. |

In this manner β-methoxyethyl-di-(4-fluorophenyl) borinate, β-ethoxyethyldi(4-methylphenyl) borinate, β-phenoxyethyldi(4-chlorophenyl) borinate and derivatives of other anhydrides such as β-methoxydi(4-butylphenyl) borinate, β-ethoxydi(4-butoxyphenyl) borinate, β-ethoxydi (4-bisphenyl) borinate, etc. can be prepared.

EXAMPLE 10

Bean defoliant activity—Greenhouse tests

Red kidney bean seeds are planted in vermiculite in 4 inch square plastic pots at a density of five to six per pot and are watered and fertilized by sub-irrigation during their growth period. This provides a continuous supply of bean plants grown under nearly identical conditions to a comparable state of development and size at the time of testing (normally between the tenth and twelfth days after planting). At this time the cotyledonary leaves are well-developed and the first set of trifoliate leaves are just emerging from the apical meristem. Just prior to the test the plants are thinned to a stand of 3 plants per pot.

Except as otherwise indicated the concentrate formulation used for these tests is a solution of 2.0 ml. of Deo-Base, 0.1 gram of "Triton X–161" and 0.2 ml. of the ester being tested. The plants are treated as follows: Each defoliant composition is applied to the plants in three pots (i.e. nine individual plants). The three pots are placed equidistant from one another on a precision turntable for spraying. This turntable is designed to turn at ten revolutions per minute and at the same time to rotate the pots with respect to the turntable itself in such a way that the plants in each pot receive a substantially uniform spray on all sides from a stationary spray nozzle. A total of 30 milliliters of liquid defoliant composition (which is prepared by diluting the concentrate formulation with water) is applied to the plants in the pots using a spray atomizer nozzle which gives maximum coverage of the foliage without run off. The level of treatment of the plants in this test is thus determined by the degree of dilution of the 30 milliliters of defoliant composition applied. The concentration of the esters in the 30 milliliters of treating solution can be easily converted into the approximate level of treatment in pounds of ester per acre of bean (or cotton) plants in the field by expressing it in parts per million (weight/volume) in dividing this number by one thousand. Thus, for example, the level of treatment imparted to the plants in the greenhouse tests using 2,000 parts of ester per million parts of spray approximates that in field tests in which a total of two pounds of ester are applied to an acre of growing bean (or cotton) plants.

After spraying, the pots are isolated from one another sufficiently to avoid any contact until the spray deposit has dried, then returned to their growth area and held under normal high growing conditions for the duration of the observation. Normally, defoliation counts are made when defoliation is first noted and are carried on for a period of 7–10 days, depending upon the activity of the chemicals being evaluated. The results are reported as percent leaves dropped, i.e. percent defoliation.

The test data gathered in this way are as follows:

| Ester No. | Concentration of treatment (parts ester per million parts spray) | Percent defoliation |
|---|---|---|
| III | 1,000 | 95 |
|  | 500 | 100 |
| V | 1,000 | 100 |
| V [1] | 1,000 | 100 |
|  | 500 | 100 |
| Deo-Base | 10,000 | 0 |
| (Control) | 5,000 | 0 |

[1] Ester dissolved in mineral oil.

EXAMPLE 11

Cotton defoliant activity—Greenhouse tests

Cotton seeds (variety Coker 100) are acid delinted and treated with a seed disinfectant and protectant and then planted in ordinary potting soil in 4 inch square plastic pots at a density of four to five per pot, and are watered and fertilized by subirrigation. After a growth period of 30 days the plants are thinned to a stand of three plants per pot and are then ready for testing. At this time the second and sometimes the third secondary leaves have emerged from the meristematic tissues.

The concentrate formulations used for these tests are the same as those of Example 10 except that various solvents are used. Also in several cases an additional spreader-sticker is added. The dilution and test procedures are the same as those of Example 10.

| Ester No. | Solvent | Concentration of treatment (parts ester per million parts spray) | Percent defoliation |
|---|---|---|---|
| I | 25% MIBK, 75% mineral oil [1] | 2,000 | 93 |
| I | Espesol-5 [1] | 2,000 | 90 [3] |
| I | Velsicol AR 50 G [2] | 2,000 | 90 |
| II | 25% MIBK, 75% mineral oil | 2,000 | 100 |
| II | 50% Deo-Base, 50% mineral oil | 2,000 | 90 |
| II | Kerosene | 2,000 | 95 [3] |
|  |  | 1,000 | 85 [3] |
| I | Mineral oil | 2,000 | 80 |
| II | do | 2,000 | 100 |
|  |  | 1,000 | 85 |
| IV | do | 2,000 | 80 [3] |
| V | do | 2,000 | 100 |
| None | do |  | 0 |
| Do | Deo-Base |  | 0 |
| IX | 75% Vesicol AR 50 G, 25% Butyl carbitol acetate | 2,000 | 71 [3] |

[1] Additional "Triton X-161" added as a sticker-spreader.
[2] Additional "Pluronic L64" added as a sticker-spreader.
[3] In these cases the total defoliation activity is about 5 percent higher than indicated due to a small amount of desiccation of the leaves.

In addition, a wettable powder concentrate containing ester VII is prepared and tested. The wettable powder concentrate consists of 46% of a hydrated silica pigment of extremely fine particle size, 2% of a lignosulfonate dispersing agent, 2% of a surface active agent and 50% of ester VII (these percentages being on a weight basis). The constituents are blended together in a ball mill and the resulting powder is diluted with water to the desired concentration prior to use. The procedure of Example 10 is again used to apply the materials to the plants. Ninety percent defoliation is obtained using a concentration of 2000 parts of ester per million parts spray.

EXAMPLE 12

Cotton defoliant activity—Field tests

Concentrate solutions of the type described in the previous examples in which the solvent is 25% methylisobutyl ketone and 75% mineral oil are used in these tests. Additional sticker-spreader is added in some cases.

The test field is divided into test plots one row wide and ten feet long (each containing approximately six or seven cotton plants). The defoliant formulations are diluted with water to obtain the most advantageous contact with the plants (ordinarily complete coverage without run off) at the particular level of treatment desired and then sprayed onto the plants as uniformly as possible with a pressure sprayer (operating at a pressure of about 30 pounds per square inch). Each defoliant lot is sprayed on two or three separate test plots and several untreated control plots are left in the test field. The plants are then observed for defoliation which ordinarily occurs from about two days to two weeks after the treatment. The following results are obtained:

| Ester No. | Additional sticker-spreader | Level of treatment (lbs. of ester per acre of plants) | Percent Defoliation |
|---|---|---|---|
| I | Emcol M-77 | 2.1 | 90 |
|  |  | 1.5 | 85 |
| II | do | 2.1 | 85 |
|  |  | 1.5 | 95 |
| II | None | 3.1 | 90 |

What is claimed is:
1. β-methoxyethyldiphenylborinate.
2. β-ethoxyethyldiphenylborinate.
3. β-phenoxyethyldiphenylborinate.

References Cited

UNITED STATES PATENTS 2,413,718   1/1947   Lincoln et al. _____ 252—49.7
3,061,627   10/1962  Lang et al. _____ 260—462

LEON ZITVER, Primary Examiner

L. DE CRESCENTE, Assistant Examiner

U.S. Cl. X.R.

71—70; 260—618, 632